Nov. 4, 1930.                E. W. KELLOGG                1,780,681
                SOUND RECORDING AND REPRODUCING APPARATUS
                      Original Filed July 27, 1928
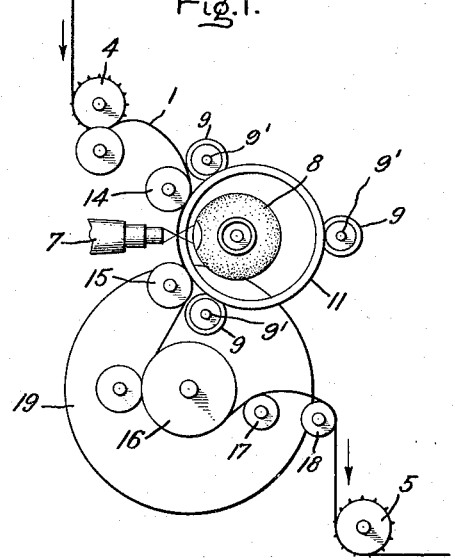
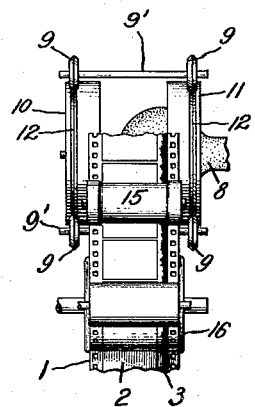
Inventor:
Edward W. Kellogg
by Charles E. Mullen
His Attorney.

Patented Nov. 4, 1930

1,780,681

UNITED STATES PATENT OFFICE

EDWARD W. KELLOGG, OF SCHENECTADY, NEW YORK, ASSIGNOR TO GENERAL ELECTRIC COMPANY, A CORPORATION OF NEW YORK

SOUND RECORDING AND REPRODUCING APPARATUS

Original application filed July 27, 1928, Serial No. 295,780. Divided and this application filed October 4, 1929. Serial No. 397,395.

My invention relates to apparatus for recording sound on a moving film and to apparatus for reproducing sound from a film record. It is the object of my invention to provide in apparatus of this character improved means for supporting the moving film at the point at which the record is made on the film or is taken from the film record.

My invention will be better understood from the following description taken in connection with the accompanying drawing, and its scope will be pointed out in the appended claims.

This application is a division of my co-pending application, Serial No. 295,780, filed July 27, 1928.

Referring to the drawing, Fig. 1 is a front view of apparatus involving my invention, and Fig. 2 is a side view of the same.

The film 1, which is shown as having the picture record 2 and the sound record 3 at one side thereof, is driven at the proper speed by the sprockets 4 and 5, which are geared to the same source of power, not shown, which for example may be a constant speed electric motor. At 7 I have shown a portion of an optical system by means of which a light beam is focused to narrow transverse light line on the sound record 3. If the apparatus is used to record sound the light beam is varied in accordance with the sound waves to variably expose the film. The light variations may comprise changes in intensity without change in the length of the light line on the film, thus producing the variable density type of record or may comprise changes in the length of the line with a constant intensity of light. If the apparatus is used to reproduce sound from a sound record a constant source of light is used and a photo-electric cell is arranged to receive the light passing through the film and modified by the sound record. In the drawing I have chosen to show the apparatus adapted for sound reproduction, hence the optical system 7 produces a constant intensity light beam which after passing through the focal point on the record passes on into the photo-electric cell 8 where it is transformed into corresponding current variation. For firmly supporting the moving film at the point of reproduction, that is, at the focal point of the light beam, I have provided the two similar freely rotatable rings 10 and 11. These rings are spaced apart so as to engage the film at the marginal or sprocket tooth opening portions and beyond the picture and sound records. Each ring is supported for free rotation by a plurality of rollers 9, three in the present example, mounted on spindles 9′ equally spaced about the periphery of the ring. Corresponding rollers of the two rings are shown mounted on a common spindle 9′ which is journaled in a suitable support, not shown. If desired, the rollers of the two rings may be individually mounted. The rings 10 and 11 are not only supported for free rotation on the rollers 9 but also are positioned laterally thereby and for this purpose each is provided with the groove 12, which is shown for example as V-shaped and engaged by the rollers 9 having a correspondingly shaped periphery. It is obvious that instead of rollers 9, the rings might be supported by means of balls running in ball races. The film is shown pressed against the faces of the rings by the pressure rolls 14 and 15. From the pressure roll 15 the film passes to the drum 16, thence over the idlers 17 and 18 to the drive sprocket 5. Secured to the shaft of drum 16 is a suitable fly wheel 19 whose inertia prevents the transmission to the reproducing point of small speed variations of sprocket 5, such for example as those due to improper sprocket action. In my copending application to which reference has been made above, I have described and claimed means by which a certain amount of driving torque is applied to the drum and flywheel from the driving motor. A further filtering of sprocket tooth vibrations is effected by the natural resilience of the film between idlers 17 and 18.

What I claim as new and desire to secure by Letters Patent of the United States is:—

1. In apparatus for recording sound on or reproducing sound from a moving film, a freely rotatable cylindrical member adapted to support the film at the recording or reproducing point and supporting means for said member comprising a plurality of rotatable members engaging the periphery of said member.

2. In apparatus for recording sound on or reproducing sound from a moving film, a freely rotatable ring arranged to support the film at the recording or reproducing point, means for pressing the film against the ring, and supporting means for said ring comprising a plurality of rotatable members having fixed centers arranged to engage the surface of the ring.

3. Apparatus for reproducing sound from a film record comprising a pair of spaced freely rotatable rings arranged to support the film at the point of reproduction and to engage it at opposite sides of the sound record thereon, a member for directing a light beam through the sound record, and a member for receiving the light passing through the sound record one of said members being arranged within one of the rings.

4. Apparatus for reproducing sound from a film record comprising a pair of coaxial rings spaced to engage the film at opposite sides of the record thereon and arranged to support the film at the point of reproduction, a plurality of rollers having fixed centers rotatably mounting said rings, means for focusing a beam of light on that part of the film supported by the rings and a photo-electric cell arranged within one of the rings.

5. Apparatus for reproducing sound from a film record comprising a pair of similar coaxial rings spaced to engage the film at opposite sides of the record thereon and arranged to support the film at the point of reproduction, said rings having guide grooves on their periphery, a plurality of supporting rollers engaging the grooves in said rings, means for focusing a beam of light on the film between the rings, and a photo-electric cell arranged within one of the rings.

In witness whereof, I have hereunto set my hand this 3rd day of October, 1929.

EDWARD W. KELLOGG.